Figure 1:
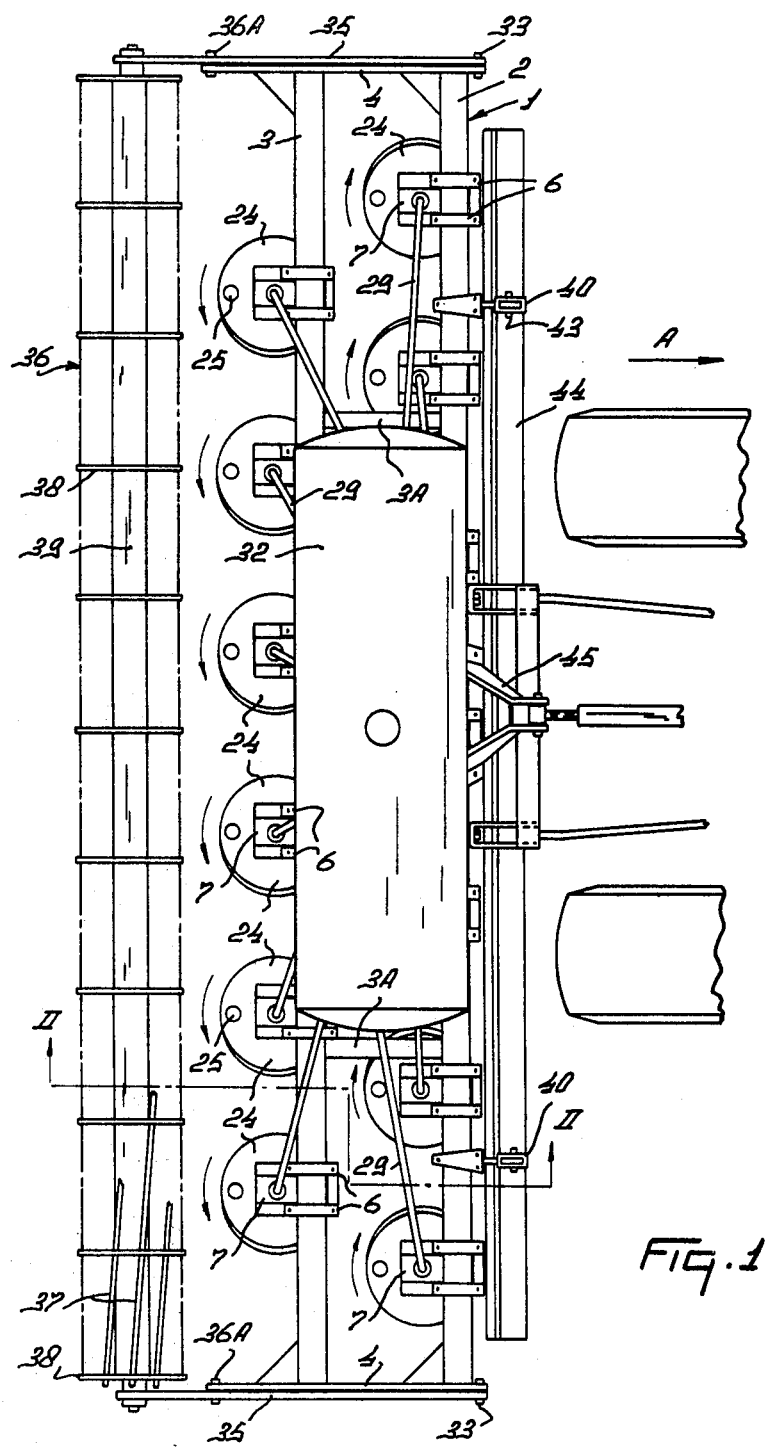

United States Patent [19]
van der Lely

[11] 4,291,637
[45] Sep. 29, 1981

[54] FREELY ROTATABLE SOIL CULTIVATING IMPLEMENTS WITH LIQUID DISPENSING

[76] Inventor: Cornelis van der Lely, 7, Brüschenrain, Zug, Switzerland

[21] Appl. No.: 853,745

[22] Filed: Nov. 21, 1977

Related U.S. Application Data

[63] Continuation of Ser. No. 689,547, May 24, 1976, abandoned.

[30] Foreign Application Priority Data

May 27, 1975 [NL] Netherlands .................. 7506200

[51] Int. Cl.³ .......................................... A01C 23/02
[52] U.S. Cl. .......................................... 111/7; 111/11; 111/87; 172/169; 172/523; 172/526
[58] Field of Search .................. 111/6, 7, 8-13, 111/87; 172/522-526, 59, 169

[56] References Cited

U.S. PATENT DOCUMENTS

| | | | |
|---|---|---|---|
| 1,105,570 | 7/1971 | Lea et al. | 111/87 |
| 2,699,023 | 1/1955 | Caldwell | 172/526 |
| 3,111,917 | 11/1963 | Dawrs | 111/6 |
| 3,131,774 | 5/1964 | van der Lely | 172/526 |
| 3,747,688 | 7/1973 | Woerman et al. | 172/149 |
| 3,774,688 | 11/1973 | van der Lely et al. | 172/526 X |
| 3,809,166 | 5/1974 | van der Lely et al. | 172/59 X |
| 4,018,170 | 4/1977 | van der Lely et al. | 111/7 |

FOREIGN PATENT DOCUMENTS

| | | | |
|---|---|---|---|
| 124777 | 6/1947 | Australia | 111/87 |
| 244656 | 1/1966 | Austria | 172/523 |
| 628635 | 6/1963 | Belgium | 172/526 |
| 1243446 | 6/1967 | Fed. Rep. of Germany | 172/523 |
| 1936446 | 1/1970 | Fed. Rep. of Germany | 111/10 |
| 1936296 | 1/1971 | Fed. Rep. of Germany | 111/11 |
| 2162433 | 7/1972 | Fed. Rep. of Germany | 172/59 |
| 2219278 | 3/1973 | Fed. Rep. of Germany | 172/59 |
| 2321422 | 11/1973 | Fed. Rep. of Germany | 172/59 |
| 804598 | 11/1958 | United Kingdom | 172/526 |

*Primary Examiner*—Steven A. Bratlie
*Attorney, Agent, or Firm*—Mason, Mason and Albright

[57] ABSTRACT

A cultivating implement has rows of tined soil working members that are freely rotatable about upwardly extending shafts. Each soil working member has tines positioned around the shaft which defines its axis of rotation. At the lower end of the shaft, a channelled feed member is attached and the shaft is hollow. Material from a container is dispensed from the container through the shaft and the feed member via a port to the ground being worked by the tines. The feed member is elongated and extends down, generally parallel to the tines of the corresponding soil working member which are mounted on circular plate supports. A further soil working member, preferably a supporting roller, is mounted behind the rows of soil working members.

7 Claims, 3 Drawing Figures

FREELY ROTATABLE SOIL CULTIVATING IMPLEMENTS WITH LIQUID DISPENSING

This is a continuation application of Ser. No. 689,547 filed May 24, 1976, now abandoned.

This invention relates to soil cultivating implements of the kind which comprise a plurality of rotatable soil working or cultivating members that are arranged in at least one row which extends transverse to the intended direction of operative travel of the implement so as to be rotatable about corresponding upwardly extending axes.

According to the invention, there is provided a soil cultivating implement of the kind set forth, wherein the soil working or cultivating members are arranged to be rotated by their contact with the soil when the implement is in operation, and wherein shafts around which said members revolve are of hollow formation and are arranged so that material can be supplied through them onto and/or into the soil whilst the implement is in use.

Figure 2:
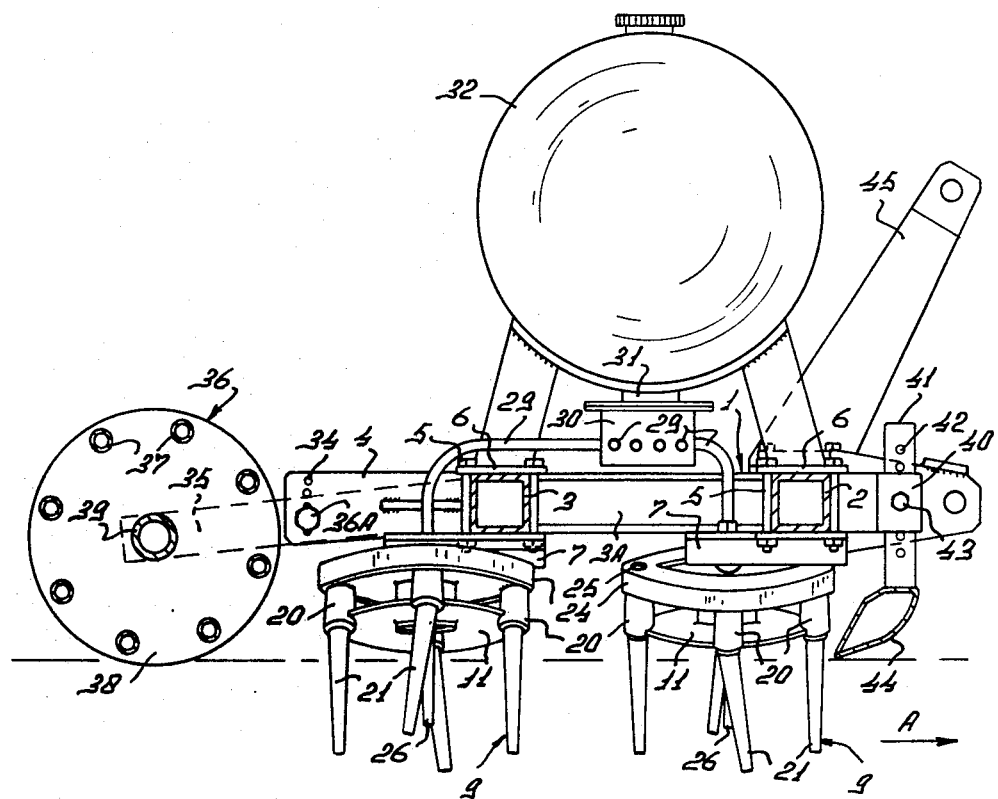
Figure 3:
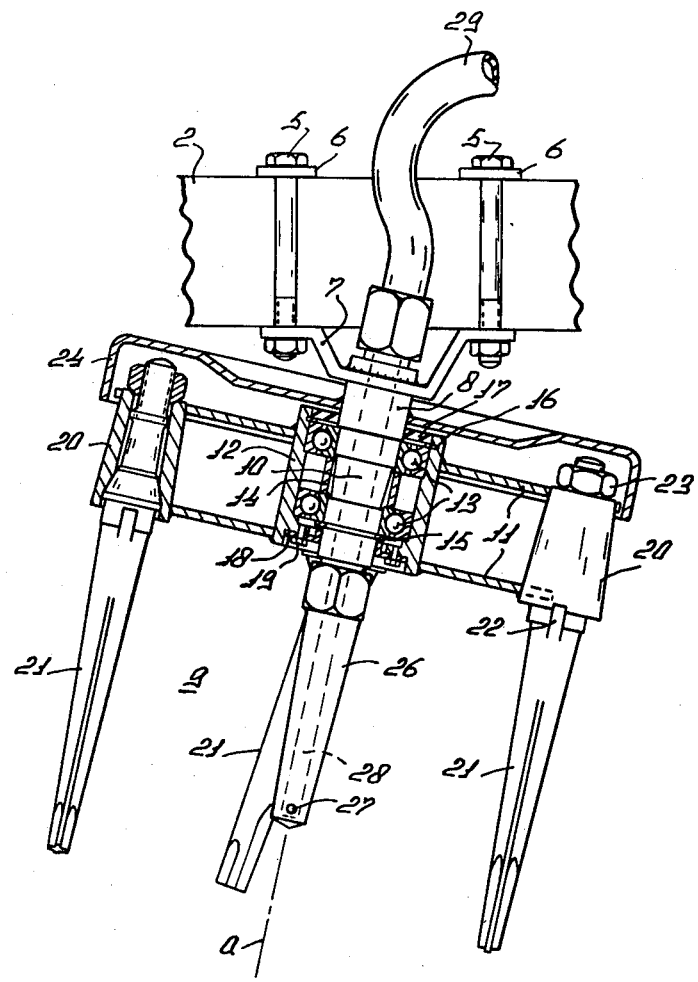

For a better understanding of the invention, and to show how the same may be carried into effect, reference will now be made, by way of example, to the accompanying drawings, in which:

FIG. 1 is a plan view of a soil cultivating implement in accordance with the invention connected to the rear of an agricultural tractor, FIG. 2 is a section, to an enlarged scale, taken on the line II—II in FIG. 1, and FIG. 3 is a part-sectional rear elevation, to an enlarged scale, of one of a number of soil working or cultivating members of the implement of FIGS. 1 and 2.

Referring to the drawings, the soil cultivating implement that is illustrated is in the form of a rotary harrow that comprises a frame portion 1 which includes two frame beams 2 and 3 that extend substantially horizontally parallel to one another in directions that are transverse and usually perpendicular, to the intended direction of operative travel of the implement which is indicated by an arrow A in FIGS. 1 and 2 of the drawings, the rear beam 3 with respect to that direction being spaced behind the leading beam 2. The spacing is maintained by parallel and substantially vertically disposed opposite side plates 4 to which the corresponding ends of the beams 2 and 3 are welded or otherwise rigidly secured, triangular strengthening plates being provided to assist in maintaining the perpendicular junctions between the beams 2 and 3 and said side plates 4. Moreover, a plurality, such as three, of supports 3A rigidly interconnect the beams 2 and 3 at more or less regular intervals between the two side plates 4. The side plates 4 are in substantially parallel relationship with the direction A and the longitudinal axes of the supports 3A are also substantially parallel to that direction. Each of the frame beams 2 and 3 is of hollow formation and polygonal cross-section, a square cross-section, as illustrated, being preferred. Whether or not the polygonal cross-section that is chosen for each beam is square, the beam concerned is so arranged that at least one flat side thereof is substantially horizontally disposed (see FIG. 2). The two side plates 4 of the frame portion 1 both extend rearwardly with respect to the direction A beyond the rear frame beam 3, the rear portions of said plates 4 being substantially sector-shaped as seen in side elevation (FIG. 2), the rearmost regions thereof having greater vertical extents than the regions thereof which lie between the beams 2 and 3.

A plurality of brackets 7 are firmly clamped to the lower substantially horizontal sides of the beams 2 and 3, said brackets 7 being regularly spaced apart from one another along the lengths of the beams 2 and 3 and each bracket 7 being firmly retained in its appointed position by four clamping bolts 5 that co-operate, at the top of the beam concerned, with two clamping plates 6 that both extend substantially parallel to the direction A in spaced apart relationship. Inspection of the clamping plates 6 in FIG. 1 of the drawings will show that the leading beam 2 with respect to the direction A is provided with seven brackets 7 whereas the rear beam 3 has six brackets 7, the arrangement being such that, when the implement is viewed from the rear in the direction A, the brackets 7 that correspond to the beam 3 are located alternately between the brackets 7 that correspond to the leading beam 2. It can be seen in FIG. 3 of the drawings that each bracket 7 has two limbs that both extend substantially parallel to the direction A at a short distance from one another. Each bracket 7 is of asymmetrical channel-shaped configuration with one limb thereof longer (from top to bottom) than the other so that the web interconnecting the two limbs has its general plane in inclined relationship with the horizontal. The web or base of each bracket 7 has the upper end of a corresponding strong stub shaft 8 welded or otherwise rigidly secured to it so that each stub shaft 8 projects downwardly from the corresponding web or base with its longitudinal axis a inclined at an angle of substantially 10° to the strictly vertical as a result of the non-horizontal dispositions of the webs or bases of the brackets 7.

Each stub shaft 8 tapers downwardly away from the corresponding bracket 7 and is formed with shoulders for the rotatable mounting of a corresponding soil working or cultivating member 9 whose axis of rotation is coincident with the longitudinal axis a of the stub shaft 8 concerned. It will be noted from the drawings that each stub shaft 8 is of hollow configuration and is formed with a central axial cavity 10 whose longitudinal axis is coincident with the corresponding axis a. The longitudinal axes a of the six or seven stub shafts 8 that correspond to the two beams 2 and 3, are contained in corresponding parallel vertical planes that are both perpendicular to the intended direction of operative travel A. It will be noted from the drawings that the longitudinal axes a of the stub shafts 8 that correspond to one of the two frame beams 2 or 3, which axes a are also the axes of rotation of the corresponding members 9, are all in substantially parallel relationship with one another, that is to say, they are all obliquely inclined downwardly from the corresponding beam 2 or 3 towards the ground surface in the same direction. However, the seven axes a that correspond to the leading frame beam 2 are all inclined to the vertical in one direction whereas the six axes a that correspond to the rear frame beam 3 are all inclined to the vertical in the opposite direction. In fact, when the implement is seen from the rear in the direction A, the axes a that correspond to the leading frame beam 2 are all inclined upwardly away from the ground to the left whereas those that correspond to the rear frame beam 3 are all inclined upwardly away from the ground to the right.

Each soil working or cultivating member 9 comprises a support which includes upper and lower parallel plates 11 that are both of annular configuration and both of which are perpendicular to the corresponding axis a. The inner edges of the annular plates 11 are both welded or otherwise rigidly secured to the outer surface of a cylindrical hub 12 which is freely rotatable around the corresponding stub shaft 8 with the aid of upper and lower ball bearings 13 whose inner races co-operate with the aforementioned shoulders on the tapering stub shaft 8. The inner races of the upper and lower ball bearings 13 are maintained in spaced apart relationship by an intervening sleeve 14, the inner race of the lower bearings 13 abutting against a circlip 15 that is engaged in a groove in the stub shaft 8 and the outer race of the upper ball bearing 13 abutting against a larger circlip 16 that is engaged in a groove in the inner wall of the cylindrical hub 12. As will be evident from a study of FIG. 3 of the drawings, the lower ends of the outer races of both the upper and lower ball bearings 13 are also lodged against supporting shoulders formed in the inner surface of the cylindrical hub 12. The upper surface of the upper larger circlip 16 supports, from beneath, an annular closure plate or seal 17 which is disposed just inside the upper end of the cylindrical hub 12 in surrounding relationship with the stub shaft 8. Small bolts 19 secure a generally circular closure plate 18 to an inwardly directed lip of the hub 12 so that said closure plate 18 extends perpendicular to the corresponding axis a around a lower end region of the corresponding stub shaft 8 and thus seals the bearings 13 from contamination by dirt from the bottom of the hub 12.

The plates 11 of each soil working or cultivating member support are provided, at regular 90° intervals around the corresponding axis a, with four generally sleeve-shaped tine holders 20 whose outer surfaces are substantially frusto-conical in an upwardly tapering direction. The four holders 20 that correspond to each member 9 are arranged at substantially the peripheries of the corresponding plates 11 and each holder 20 receives a fastening portion of a corresponding rigid tine 21. The open lower end of each holder 20 is formed with a pair of diametrically opposed notches or recesses and those notches or recesses co-operate with similarly disposed lugs 22 that are integrally carried at opposite sides of the corresponding tine 21. This arrangement prevents the fasteniing portion of the tine 21 from turning about its own longitudinal axis in the holder 20 once a frusto-conically faced fastening nut 23 which co-operates with a screw-threaded upper part of the fastening portion is securely tightened. In addition to its straight fastening portion, each tine 21 also comprises a straight soil working portion that extends downwardly away from an integral junction with the fastening portion in such a way that the longitudinal axes of said two portions are inclined to one another by a small angle which conveniently, but not essentially, has a magnitude of substantially 8°. Small arrows appear in FIG. 1 of the drawings to indicate the directions in which the freely rotatable members 9 will normally revolve during the use of the implement and an examination of FIGS. 2 and 3 of the drawings will make it clear that the soil working portions of the tines 21 are inclined rearwardly from top to bottom relative to those directions so that said portions of the tines 21 may be considered as trailing to some extent with respect to the directions of rotation concerned. As will be further described below, rotation of the members 9 in the indicated directions is brought about, during operative travel of the implement in the direction A, because the soil working portions of the tines 21 which, at any instant, are located at one side of each corresponding axis a penetrate to a considerably greater depth into the soil than do the soil working portions which, at the same instant, are at the opposite sides of the corresponding axes a.

The soil working portion of each tine 21 is of downwardly tapering configuration and commences, at substantially its integral junction with the corresponding fastening portion, with a substantially circular cross-section. Considered downwardly towards the free end or tip from that junction, the soil working portion gradually changes its cross-sectional shape until, near the lowermost free end or tip, that shape is basically, although not strictly, rectangular. In this lower region, the soil working portion is considerably flattened in such a way that a diagonal between those two opposite corners of the basically rectangular cross-section that are furthest apart is tangential to a circle centered upon the corresponding axis a. Again in a lowermost free end region of the soil working portion of each tine 21, the four what would otherwise be substantially flat sides of that portion are formed with recesses or grooves which extend upwardly along the corresponding soil working portion from its lowermost free end or tip to merge, at their upper ends, into the corresponding four substantially flat sides of the soil working portion concerned. It will be noted from FIG. 3 of the drawings that the two recesses or grooves that face generally forwardly from the soil working portion of each tine 21 with respect to the intended direction of operative rotation of the corresponding member 9 have substantially twice the upright length of those two recesses or grooves which face generally rearwardly with respect to the same direction. The recesses or grooves become progressively shallower as the distance from the lowermost free end or tip of the soil working portion of the corresponding tine 21 increases before, as mentioned above, said recesses or grooves finally merge into the substantially flat sides of the soil working portion concerned. Although it is greatly referred that the lower region of the soil working portion of each tine 21 should be of basically rectangular cross-section, this is not absolutely essential and it is possible for other polygonal cross-sections to be employed in substitution.

Each stub shaft 8 has a corresponding protective hood or cover 24 of annular shape welded or otherwise rigidly secured to it at a short distance below the corrresponding bracket 7 and immediately above the upper end of the corresponding rotatable hub 12. The hood or cover 24 protects the upper end of the hub 12 concerned and also the upper ends of the corresponding four tine holders 20 together with the corresponding fastening nuts 23 and the screw-threaded parts of the tine fastening portions with which those nuts co-operate. Each hood or cover 24 is, however, formed with a single hole 25 (FIGS. 1 and 2) through which access can be obtained to any one of the four fastening nuts 23 merely by turning the member 9 concerned about its axis of rotation a until the required nut is in register with the access hole 25. The lower end of each hollow stub shaft 8 extends downwardly beyond the rotary support for the corresponding soil working or cultivating member 9 and is there detachably provided with a corresponding feed member 26 that extends in axial prolongation of the stub shaft 8 concerned. Each feed member 26 is of gently downwardly tapering configuration and is formed, close to its lowermost end, with an outlet port 27 that is directed rearwardly with respect to the direction A. The outlet port 27 of each feed member 26 communicates with an axial channel 28 through that member 26, the lowermost end of said channel 28 being closed, apart from the provision of the outlet port 27, while its uppermost end is open so as to communicate with the corresponding axially coincident, but larger diameter, cavity 10. As can be seen in outline in FIG. 3 of the drawings, the releasable connection of each feed member 26 to the lowermost end of the corresponding stub shaft 8 is accomplished in a sealed manner with the aid of a corresponding cup nut, means (such as a notch and co-operating projection) that is not visible in the drawings being provided to ensure that, when each member 26 is installed, its outlet port 27 will face in the required direction as discussed above.

In the foremost row of members 9 that corresponds to the leading frame beam 2, the brackets 7 which correspond to those two soil working or cultivating members 9 which are at the opposite ends of that row are spaced from the corresponding ends of the beam 2 by distances which are substantially half the distances between each bracket 7 and its neighbour, or one of its neighbours, along the row. However, in the rear row of members 9 that corresponds to the rear frame beam 3, the distances between the brackets 7 that support the opposite end members 9 of said row and the neighbouring ends of the beam 3 are equal to, or greater than, the distance between each bracket 9 along said row and its neighbour, or one of its neighbours, in that row. It is preferred that, in each row, the distance between one axis of rotation a and its immediate neighbour along the same row should be substantially twice the width of the strip of land that is worked by each member 9 during the operation of the implement, the latter magnitude preferably having a value of substantially 30 centimeters. It is preferred that the distances between successive axes of rotation a in each row should be the same and that the perpendicular distance between the two substantially vertical planes that contain the corresponding rows of axes a should be the same as the spacings between the successive axes of rotation a in each row.

Each hollow stub shaft 8 projects upwardly beyond the web or base of the corresponding bracket 7 and its upper end is releasably connected by a cup nut or the like to one end of a corresponding material supply duct 29 whose opposite end is coupled to a fluid distributor 30. The fluid distributor 30, or each fluid distributor 30 when more than one thereof is provided, is connected by a large diameter duct 31 to the bottom of a container in the form of a tank 32. The tank 32 is of cylindrical configuration and is arranged centrally across the width of the implement with its longitudinal axis horizontally disposed in perpendicular relationship with the direction A. The tank 32 is provided centrally at its top with a filling opening which has a cap and said tank is intended to contain fluid materials for promoting the growth of plants. Such materials will often be liquids such as, purely for example, solutions of fertilisers in water or aqueous or other solutions of growth-stimulating hormones and the like. The tank 32 may also contain pesticides and/or herbicides in liquid form. The tank 32 is carried above the frame portion 1 by supports that are upwardly convergent when the implement is viewed in side elevation (FIG. 2), the lower ends of said supports being secured to the tops of the frame beams 2 and 3.

Horizontally aligned pivot bolts 33, or equivalent stub shafts, turnably connect two arms 35 to the side plates 4 of the frame portion 1 in such a way that said arms 35 are turnable upwardly and downwardly about the axis defined by the pivot bolts 33 alongside the relatively remote surfaces of the two side plates 4. The sector-shaped region of each side plate 4 is formed, close to its rearmost edge, with a row of holes 34 that are equidistant from the axis defined by the pivot bolts 33 and each arm 35 is formed with at least one hole at the same distance from said axis. The arms 35 can thus be retained in chosen angular positions about the axis defined by the pivot bolts 33 by entering horizontal bolts 36A through chosen holes 34 and through the registering holes, or chosen registering holes, in the arms 35. Once the bolts 36A are tightened, a rigid disposition of the arms 35 relative to the frame portion 1 is attained. The arms 35 project rearwardly with respect to the direction A beyond the side plates 4 and, between their rearmost ends, substantially horizontally aligned bearings rotatably carry an open-formation ground roller 36 that is arranged to be rotated freely by ground contact during operative progress of the implement in the direction A. The axis of rotation that is defined by the horizontally aligned bearings is substantially parallel to the lengths of the hollow beams 2 and 3 and thus substantially perpendicular to the direction A. The roller 36 comprises a central axially disposed tubular support 39 to which a plurality, such as eleven, of vertical plates 38 of circular formation are secured at regular intervals so that all of them are parallel to the direction A. A plurality, such as eight, of holes are formed close to the periphery of each plate 38 and elongated elements 37 which may be of solid rod formation, or of tubular formation as illustrated, are entered through the holes in the successive plates 38 so as to extend helically around the axis of rotation of the roller 36 at regular intervals around that axis. The roller 36 primarily serves two functions; firstly, it acts as a further soil working member which will crush any large lumps of soil left on the ground surface by the foregoing members 9 with a concurrent gentle smoothing and compressing effect upon the already worked soil and, secondly, it serves a depth control function inas much as the level of its axis of rotation that is chosen relative to the level of the frame portion 1 substantially determines the maximum depth to which the tines 21 of the members 9 can penetrate into the ground (see particularly FIG. 2).

The leading frame beam 2 carries, at locations towards its opposite ends, two substantially vertical sleeve-like holders 40 that are actually disposed in advance of the beam 2 with respect to the direction A. Each holder 40 receives a corresponding flat arm 41 that is upwardly and downwardly adjustable in position relative to the holder 40 concerned and thus relative to the frame portion 1. Each flat arm 41 is formed with a row of holes 42 and the walls of the holders 40 are formed with horizontally aligned holes and horizontal retaining bolts 43 are provided for entry through the holes in the walls of the holders 40 and a chosen one of the holes 42 in each of the rows thereof. The lowermost ends of the two arms 41 are secured to the top of a levelling member 44 that is in the form of a hollow beam which has the cross-section that can be seen in FIG. 2 of the drawings, said leveling member 44 being disposed substantially horizontally in substantially perpendicular relationship with the direction A. It will be seen from FIG. 2 of the drawings that, in cross-section, a leading region of the beam which affords the member 44 is convexly rounded, the lower edge of this convexly rounded portion merging into a substantially flat portion by at least the rearmost edge of which said member 44 bears against the ground surface throughout all or part of its width during the operation of the implement.

The frame portion 1 is provided, centrally across the width of the implement and at the front thereof with respect to the direction A, with a coupling member or trestle 45 that is arranged for pivotal connection to the free ends of the upper and lower lifting links of a three-point lifting device or hitch carried at the rear of an agricultural tractor or other operating vehicle in a manner which is generally known *per se* and which can be seen, in outline, in FIG. 1 of the drawings.

In the use of the soil cultivating implement that has been described, its coupling member or trestle 45 is connected to the three-point lifting device or hitch at the rear of an agricultural tractor or other operating vehicle and the implement is supportted from the ground by the lifting device or hitch, by the ground roller 36, by the tines 21 and by the levelling member 44. As previously mentioned, the level of the axis of rotation of the rear-mounted roller 36 that is chosen relative to the level of the frame portion 1 is a principal factor in determining the maximum depth of penetration of the tines 21 of the members 9 into the soil that is possible, said level of the axis of rotation of the roller 36 being determined by entering the bolts 36A in appropriate holes 34 and the co-operating holes, or chosen co-operating holes, in the arms 35. Before work commences, the arms 41 are adjusted relative to the holders 40 to bring the levelling member 44 to a position relative to the frame portion 1 that substantially matches the position of the bottom of the roller 36 relative thereto as shown in FIG. 2 of the drawings. As the implement makes operative progress in the direction A, the soil over which it passes is first levelled by the member 44 which spreads and flattens the soil before it is engaged by the tines 21 of the two rows of soil working or cultivating members 9. Thus, the levelling member 44 ensures that the soil to be worked is evenly distributed throughout the working width of the implement before that soil is engaged by the members 9. The members 9 rotate more or less regularly and more or less continuously in the directions that are indicated by small arrows in FIG. 1 of the drawings, the direction of rotation for all the members 9 of the leading row being the same and the directions of rotation of all of the members 9 of the rear row being the same but opposite to those of the first row. As briefly discussed above, the rotation of the members 9 is caused by ground contact alone and results from the fact that, as seen in rear elevation, the soil working portions of those tines 21 which, at any instant, are to the right of the corresponding axes a in the leading row and to the left of the corresponding axes a in the rear row, penetrate into the ground to a significantly greater extent than do the soil working portions of those tines 21 which, at the same instant, are at the opposite sides of the corresponding axes a. Thus, the resistance to dragging motion through the soil at one side of each axis a is greater than it is at the opposite side thereof and the members 9 consequently revolve about the axes a. Clearly, should the soil working portion of one of the tines 21 that is at the side of the corresponding axis a where it penetrates less deeply into the soil meet a substantially immovable obstacle, such as a firmly embedded stone, the direction of rotation of the member 9 concerned will be temporarily reversed until the obstacle has been avoided, this being conducive to non-breakage of the tines 21 and to a long working life of each member 9.

During working of the soil by the members 9, fluid material can be fed from the tank 32 through the or each fluid distributor 30 and the ducts 29 to the hollow stub shafts 8 of the soil working or cultivating members 9. The fluid material may be introduced into the soil through the outlet ports 27 of the feed members 26 or, when the feed members 26 are removed from the lower ends of the stub shafts 8, it may be delivered directly from the lowermost ends of those stub shafts onto and-/or into the soil, the free lowermost ends of the stub shafts 8 being disposed beneath the rotary mountings of the corresponding members 9 (see FIG. 3). The tank 32, the distributor or distributors 30, the ducts 29 and the stub shafts 8, with or without the feed members 26, constitute a mechanism for introducing fluid onto and-/or into the soil. As previously discussed, the fluid material introduced by the implement may be a liquid intended to promote the growth of plants but it is noted that it could also be a basically gaseous material such as ammonia. The mechanism that has just been discussed includes valve means arranged to allow fluid to pass from the tank 32 to the stub shafts 8 only when required which, of course, will usually be only when the implement is actually in operation. If the implement is to deal with gaseous fluids under pressure, the valve means should be of a kind which will resist such pressure, the valve means conveniently, but not essentially, being incorporated in the or each distributor 30 or in the large diameter duct or ducts 31 that lead to the distributor or distributors 30. Clearly, the tank 32 must be capable of resisting the internal pressure that exists under such circumstances and must have a leak-proof filler cap. In any case, when fluid material is fed from the tank 32 to the members 9 while the implement is in operation, said material is ejected from each member 9 at a location which is substantially coincident with the axis of rotation of that member and, since the members 9 are driven by ground contact alone and thus revolve at a relatively slow speed, their tines 21 do not spread the delivered material to any great extent so that the desired even mixing of that material with the worked soil is not interfered with. The roller 36 that is arranged behind the two rows of soil working or cultivating members 9 with respect to the direction A occupies such a position that it will co-operate with the tines 21 of the rear row of members 9 in working the soil. The roller 36 has a levelling and compressing effect upon the soil to which material has already been supplied from the tank 32 and will tend to crush any broken lumps of soil that may have been left upon the ground surface by the tines 21 of the foregoing members 9. It is well known that seeds and like granular materials tend to behave in many respects like liquids when they are to be dealt with in significant quantities. Bearing this in mind, it is noted that, with but little modification, the mechanism for introducing fluid material onto and/or into the soil that has been described could be employed in the direct sowing of seeds or the direct supply of a granular material from an appropriate container equivalent to the tank 32. Such a use of the described implement is within the scope of the present invention.

Although various features of the soil cultivating implement that have been described and/or that are illustrated in the accompanying drawings will be set forth in the following claims as inventive features, it is emphasised that the invention is not necessarily limited to those features and that it includes within its scope each of the parts of the soil cultivating implement that have been described, and/or that are illustrated in the accompanying drawings, both individually and in various combinations.

What I claim is:

1. A soil cultivating implement comprising a frame and at least one transverse row of tined soil working members rotatably mounted on upwardly extending shafts that are connected to said frame, the axes of rotation of the soil working members being defined by said shafts and inclined to the vertical, said axes being substantially aligned with one another in a transverse plane, at least one of said soil working members comprising a support and two downwardly extending tines diametrically mounted on said support with respect to the respective axis of rotation, said support together with said tines being freely rotatable about the corresponding shaft, said shaft being fixed to the frame and being non-rotatable relative to said tines during operation, the interior of said shaft comprising a cavity in communication with a fluid container supported on said implement, said cavity leading to a channelled feed member that comprises a downwardly extending extension of said shaft, the lower end of said feed member co-extending with said tines and said tines being rotatable around the feed member during operation responsive to contact with the ground, said lower end having an outlet port that communicates with an interior channel of said feed member, said outlet port being directed rearwardly with respect to the normal direction of travel, said feed member being detachable from the lower end of said shaft.

2. An implement as claimed in claim 1, wherein there are two rows of soil working members and said rows are arranged one behind the other with respect to the direction of travel, the axes of rotation of the soil working members of the rear row being all inclined in the same direction and that direction being opposite to the direction of inclination of the axes of rotation of the soil working members of the leading row.

3. An implement as claimed in claim 1, wherein each tine has a fastening portion secured in a corresponding holder, each holder extending substantially parallel to said shaft and tapering upwardly, the tine holders of the working members being mounted on circular plate-shaped supports which are connected to corresponding shafts.

4. An implement as claimed in claim 1, wherein a levelling member is positioned in front of the soil working members with respect to the normal direction of travel, said levelling member being connected to said frame and being upwardly and downwardly movable with respect to the soil working members, said levelling member comprising a rounded-off leading surface which extends downwardly and rearwardly.

5. An implement as claimed in claim 4, wherein said levelling member is connected to said frame at locations adjacent the opposite ends of said member by substantially vertically extending arms, said levelling member being a hollow beam.

6. An implement as claimed in claim 1, wherein a further soil working member is connected to the frame and rotatable about a substantially horizontal axis, said further member being interconnected to the frame by adjusting means and fixable in position to support the implement, said further member being elongated in the direction of its horizontal axis of rotation and comprising a plurality of curcumferentially arranged elongated elements that extend substantially parallel to a central support of said further member.

7. An implement as claimed in claim 1, wherein said feed member has a downwardly tapering configuration and normally extends into the ground with said tines during operation.

* * * * *